(12) United States Patent
Takaichi et al.

(10) Patent No.: US 7,547,985 B2
(45) Date of Patent: Jun. 16, 2009

(54) WIND TURBINE APPARATUS

(75) Inventors: Kazuhiko Takaichi, Osaka (JP); Junichi Hitachi, Osaka (JP); Yukiyasu Mizuno, Osaka (JP); Tooru Minamii, Amagasaki (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 331 days.

(21) Appl. No.: 11/659,220

(22) PCT Filed: Jul. 20, 2005

(86) PCT No.: PCT/JP2005/013290

§ 371 (c)(1),
(2), (4) Date: Feb. 2, 2007

(87) PCT Pub. No.: WO2006/013722

PCT Pub. Date: Feb. 9, 2006

(65) Prior Publication Data

US 2008/0309086 A1 Dec. 18, 2008

(30) Foreign Application Priority Data

Aug. 2, 2004 (JP) .............................. 2004-225604

(51) Int. Cl.
*F03D 9/00* (2006.01)
*F03D 7/02* (2006.01)
(52) U.S. Cl. ................. 290/55; 290/44; 416/1; 416/4.3
(58) Field of Classification Search ............... 290/43, 290/44, 54, 55; 416/1, 4.3; 415/908
See application file for complete search history.

(56) References Cited

U.S. PATENT DOCUMENTS 2,487,836 A * 11/1949 Turnbull ..................... 416/155

(Continued)

FOREIGN PATENT DOCUMENTS

DE 296 09 794 U1 8/1996

(Continued)

OTHER PUBLICATIONS

International Search Report for International Appl. No. PCT/JP2005/13290, Japanese Patent Office, mailed on Sep. 27, 2005, 1 page.

(Continued)

*Primary Examiner*—Nicholas Ponomarenko
(74) *Attorney, Agent, or Firm*—Sterne, Kessler, Goldstein & Fox P.L.L.C.

(57) ABSTRACT

Conventionally, a main shaft of the wind turbine apparatus has awkward such as heaviness or difficulties of assembling, since the length of the main shaft must be long to support a generator rotor. It is requested originally to light heaviness of a wind turbine apparatus, since it supports a wind wheel and a generator etc. on a tower at prescribed height. A hub 29 supported on the one side of the main shaft 10, a generator rotor 12 supported on the other side of the main shaft 10, the main shaft housing 40 and the generator housing 20 are combined, the generator rotor 12 having a backward opening is fixedly provided on the rear end of the main shaft 10, the main shaft 10 and the generator rotor 12 are detachably fixed through the opening, and a rotational fitting (rod bearing 33) for a pitch control shaft 37 is at least disposed at the rear space of the generator housing 20.

4 Claims, 3 Drawing Sheets

U.S. PATENT DOCUMENTS

| | | | | | |
|---|---|---|---|---|---|
| 4,329,117 | A | * | 5/1982 | Doman | 416/170 R |
| 4,435,646 | A | * | 3/1984 | Coleman et al. | 290/44 |
| 4,527,072 | A | * | 7/1985 | van Degeer | 290/55 |
| 6,609,889 | B1 | * | 8/2003 | Vilsboll | 416/1 |
| 6,833,632 | B2 | * | 12/2004 | Becker et al. | 290/55 |
| 6,911,741 | B2 | * | 6/2005 | Pettersen et al. | 290/44 |
| 7,230,347 | B2 | * | 6/2007 | Brown et al. | 290/55 |

FOREIGN PATENT DOCUMENTS

| | | |
|---|---|---|
| DE | 102 55 745 A1 | 6/2004 |
| JP | 5-500995 | 2/1993 |
| JP | 2001-304094 | 10/2001 |
| JP | 2002-303252 | 10/2002 |
| JP | 2002-303253 | 10/2002 |
| JP | 2002-315395 | 10/2002 |
| WO | WO 2004/027260 A1 | 4/2004 |

OTHER PUBLICATIONS

Supplemental European Search Report for corresponding application EP05762054, European Patent Office, dated Jul. 24, 2008, 3 pgs.

* cited by examiner

WIND TURBINE APPARATUS

BACKGROUND OF THE INVENTION

1. Field of the Invention

The invention relates to a wind turbine apparatus for generating electrical energy by means of wind energy, especially relates to a wind turbine apparatus having a variable pitch angle mechanism of wings.

2. Background Art

Conventionally, a wind turbine apparatus having a generator is known that it generates electrical energies by changing wind energies changed to rotation powers through wind wheel, and the rotation powers is transmitted to the generator connected with the wind wheel.

There are some types of this kind of wind turbine apparatus, such as the speed-increasing type, which generate electricity by increasing the rotation speed of a wind wheel by using speed-increasing device having a gear mechanics, and such as the direct type, which generate electricity without increasing the rotation speed of the wind wheel and transmit the rotation. The latter is more excellent than the former in the point that the speed-increasing device having complex mechanisms becomes unnecessary, even though a larger-scale (large diameter) generator should be needed.

Moreover, a wind turbine apparatus having changeable a pitch mechanism is known, which adjust a rotational speed of the wind wheel to a suitable rotational speed for a generator by changing pitch angles of braids of the wind wheel according to the speed of the wind.

Then, a wind turbine apparatus having the main shaft supporting hub at its top end, and supporting a generator rotor is also known as one of above-mentioned direct type having the changeable pitch mechanism (For instance, see patent document 1 and patent document 2).

However, since the generator rotator is supported on the main shaft, the main shaft had to be designed long, and weight became heavy, so troubles of its heavy weights and bad assembling properties are found in the generator disclosed in the patent document 1 and 2. Moreover, since the wind turbine apparatus device has a structure to support heavy loads such as a wind wheel and a generator on the tower of prescribed height, it is originally requested to lighten the wind turbine apparatus as much as possible.

BRIEF SUMMARY OF THE INVENTION

Problems to be Solved by the Invention

The problems to be solved is to achieve lightening and compacting of wind turbine apparatus, which supports keeps the heavy loads such as a wind wheel and a generator at prescribed height.

Means for Solving the Problem

A wind turbine apparatus of this invention comprises a turn base on a top of a tower, a counter on the turn base, a stay on the counter, a main shaft housing and a generator housing on the stay, a bearing provided between the main shaft housing and a main shaft, a hub supported on the one side of the main shaft, and a generator rotor supported on the other side of the main shaft.

And, the main shaft housing and the generator housing are combined.

And, the generator rotor has a backward opening, and the main shaft and the generator rotor are detachably fixed through the opening.

Moreover, the rotational fitting for a pitch control shaft is at least disposed at the rear space of the generator housing.

ADVANTAGEOUS EFFECTS OF THE INVENTION

As a wind turbine apparatus of this invention comprises a turn base on a top of a tower, a counter on the turn base, a stay on the counter, a main shaft housing and a generator housing on the stay, a bearing provided between the main shaft housing and a main shaft, a hub supported on the one side of the main shaft, and a generator rotor supported on the other side of the main shaft, then the whole length of the wind turbine apparatus can be shortened with supporting the generator rotor only by the main shaft. As a result, arrangements of an oil-hydraulic cylinder for pitch control etc., more shortening of the whole length can be achieved.

And, as the main shaft housing and the generator housing are combined, relatively rotating between the main shaft housing and the generator housing is impossible, support legs etc. for attaching of the generator housing are unnecessary, the number of parts can be decreased, and the simplification and the reduction in costs of the installation work can be achieved.

And, as the generator rotor having a backward opening in the generator housing, and the main shaft and the generator rotor are detachably fixed through the opening, if a attachment board is removed, with touching the generator rotor to the main shaft from back side of the main shaft, and keeping this touching condition, operator can insert his/her hands from back side into the generator rotor, and can fixedly provide the generator rotor on the main shaft with inserting and tightening bolts between flanges. Additionally, lightening and compacting of the wind turbine apparatus can be achieved.

Moreover, since the rotational fitting of the pitch control shaft is at least arranged in the part of the rear side opening of the generator housing, it is allowed to arrange easily a part of pitch control mechanism at the inner of the generator housing, also shortening of the whole length of the nacelle can be achieved. Moreover, as the generator housing is opened to backward, also the installation and the arrangement of related mechanisms etc. are not restricted, and then simplification of the installation work can be achieved.

BRIEF DESCRIPTION OF THE DRAWINGS/FIGURES

DETAILED DESCRIPTION OF THE INVENTION

Best Mode for Carrying Out the Invention

Next, embodiments of the invention are described.

Figure 1:
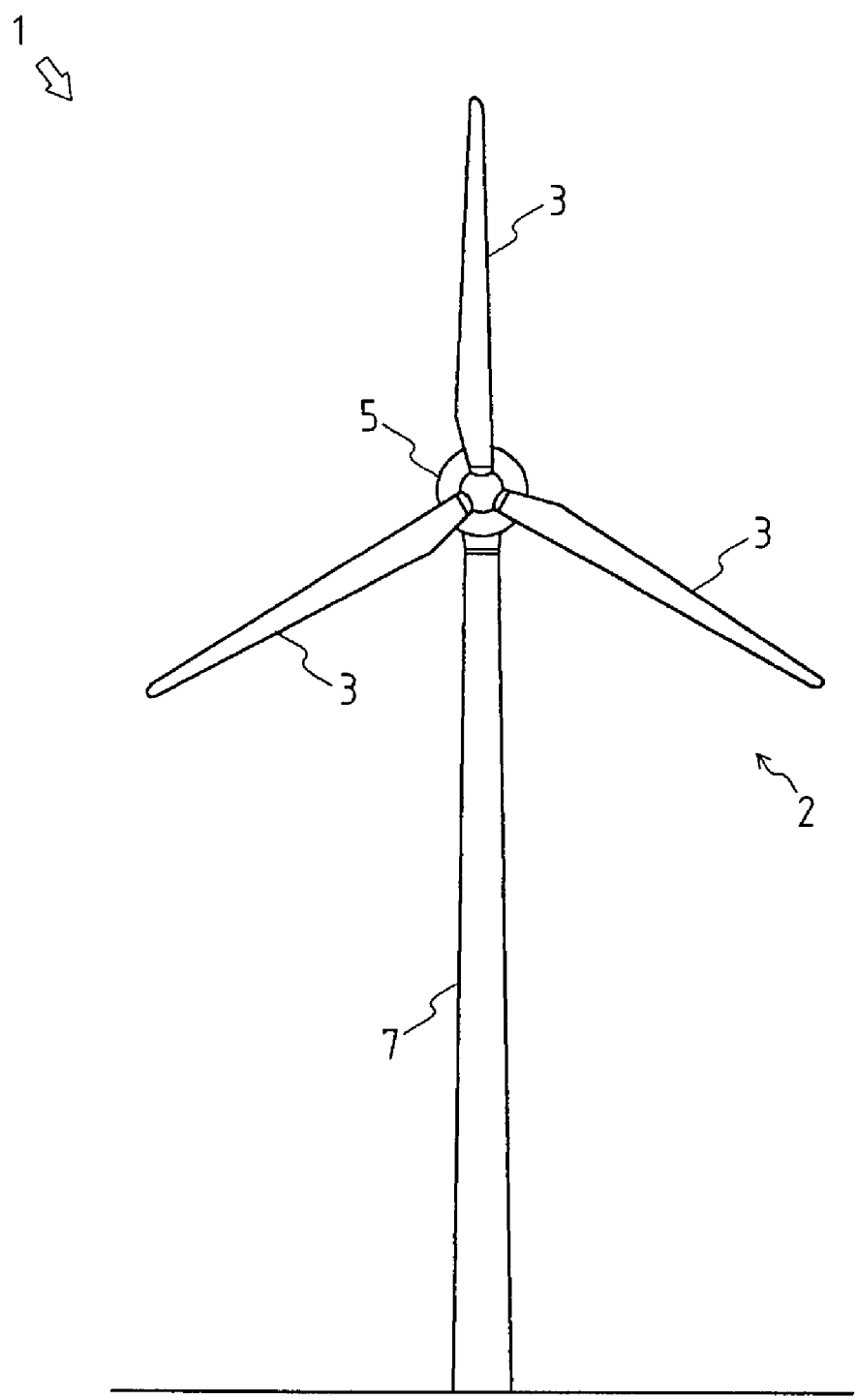
FIG. 1 is a front view that shows one embodiment of a wind turbine apparatus 1 to which the present invention is applied.
Figure 2:
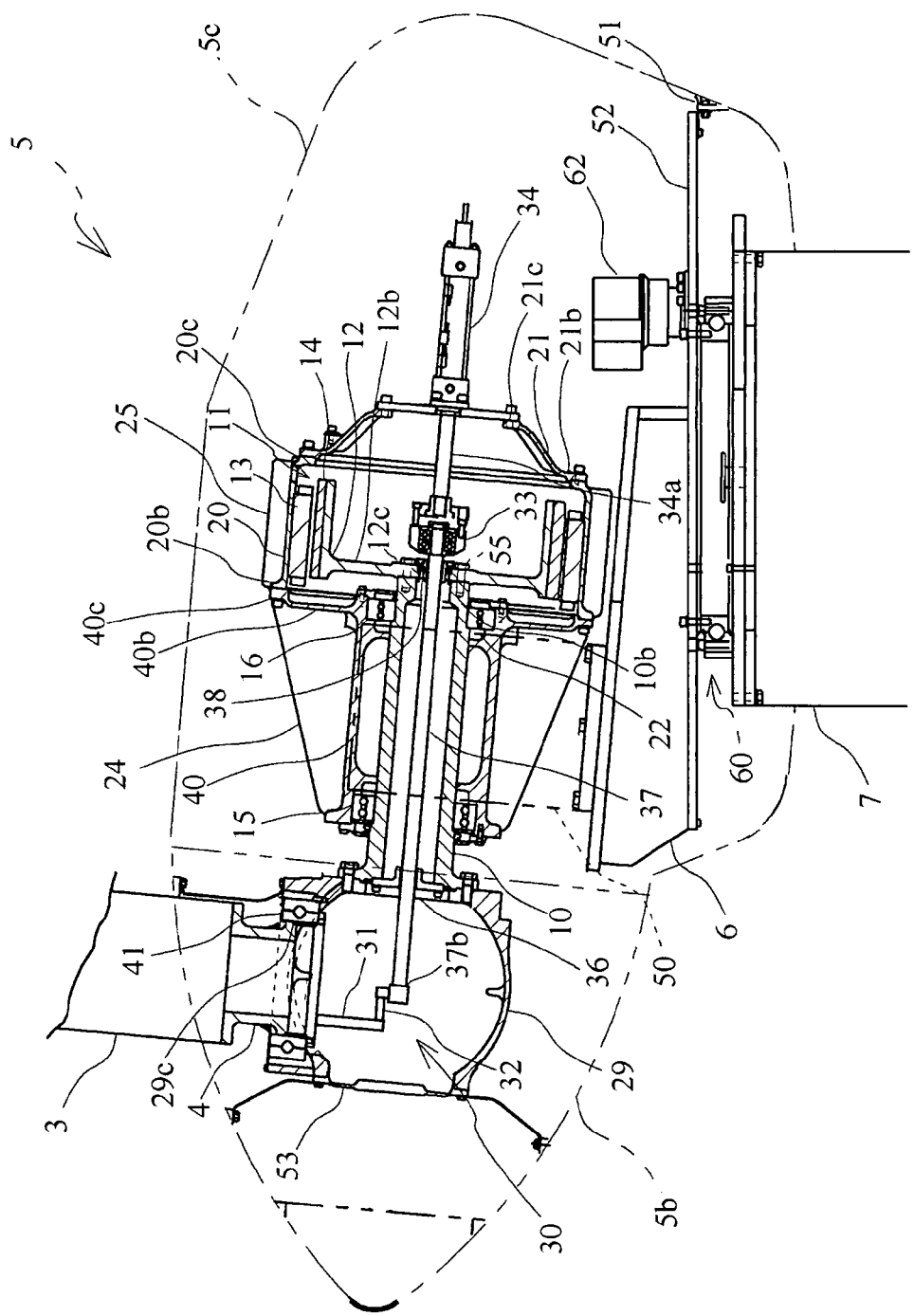
FIG. 2 is a side view cross section that shows a structure in nacelle 5 of the wind turbine apparatus 1.
Figure 3:
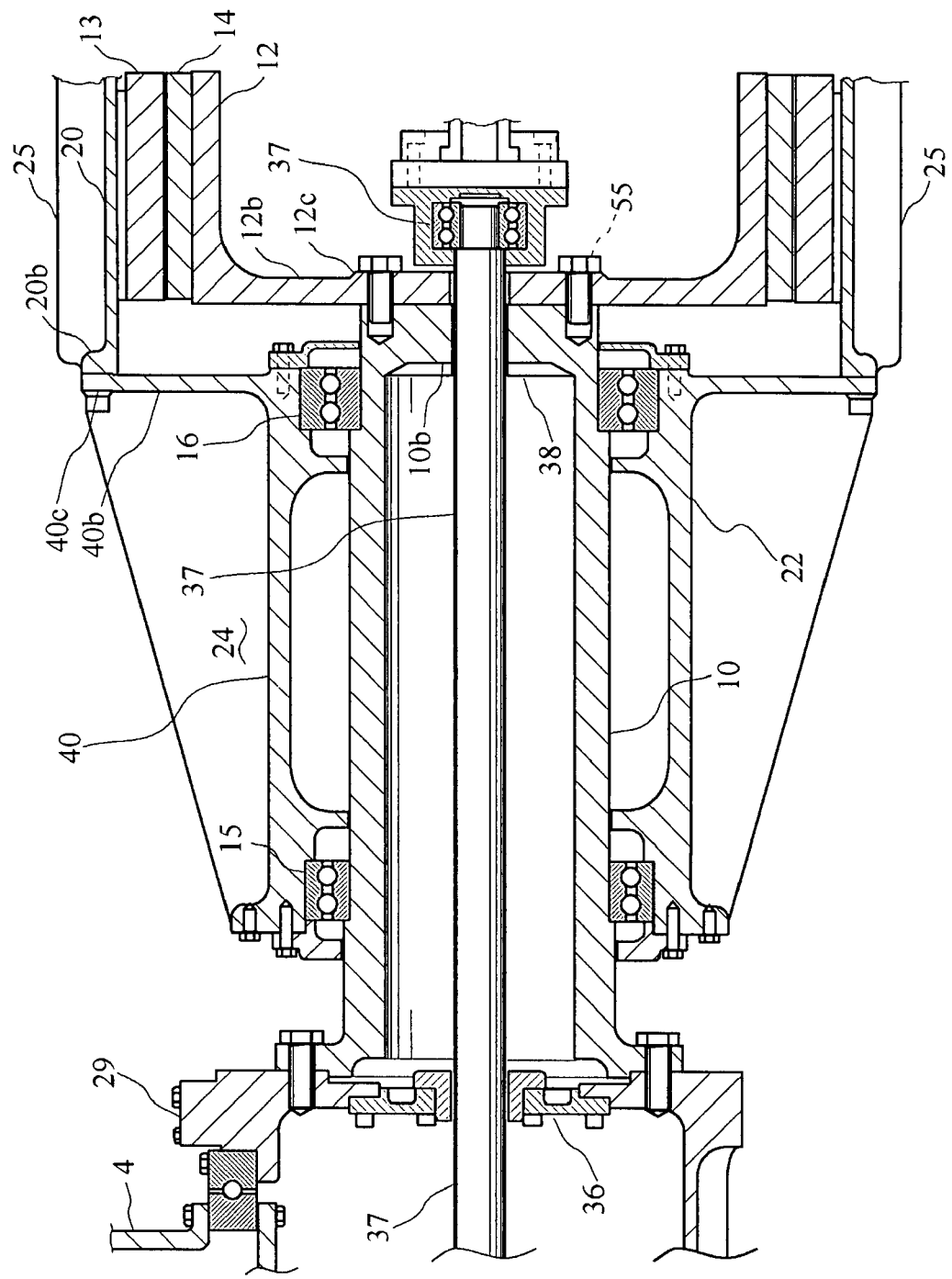
FIG. 3 is an expansion side view cross section that shows around the main shaft 10.

FIG. 1 is a front view that shows one embodiment of a wind turbine apparatus 1 to which the present invention is applied, FIG. 2 is a side view cross section that shows a structure in nacelle 5 of the wind turbine apparatus 1, FIG. 3 is an expansion side view cross section that shows around the main shaft 10.

By referring FIG. 1 and FIG. 2, the outline composition of the wind turbine apparatus 1 is described.

The wind turbine apparatus 1 of this embodiment is an apparatus that has a generator 11 that generates electrical energies by converting wind energies changed to rotational powers through a wind wheel 2, and the rotation powers is transmitted to the generator 11 connected directly with the wind wheel 2 through a main shaft 10. The wind turbine apparatus comprises, the wind wheel 2 changing wind energies into rotational power, the main shaft 10 as a rotary shaft of the wind wheel 2, the generator 11 converting the rotational power of the wind wheel 2 into electrical energies, the nacelle 5 houses the main shaft 10 and the generator 11, the tower 12 supporting the nacelle 5 at prescribed height, and so on.

The wind wheel 2 is consists of plural braids 3 (it has three pieces of this embodiment shown in FIG. 1), and these braids 3 are attached to the main shaft 10. Each braid 3 is made from a light material such as resins (for instance, fiber reinforced plastics). In this wind turbine apparatus 1, a changeable pitch device 30 is connected with the attaching base of the braid 3, and a pitch angle of the braid 3 can be changed with the changeable pitch device 30. As to the changeable pitch device 30 is described later.

Turn device 60 is comprised in wind turbine apparatus 1, and moreover, the nacelle 5 is turned by the turn device 60, and wind wheel 2 is turned in the direction against to the wind. Turn device 60 is set in top of the tower 7, and an oil-hydraulic motor 62 turns and supports a turn base 52. The turn base 52 sets a counter 6 on its upper surface.

A stay 50 supporting main shaft housing 40, a not illustrated hydraulic unit to operate an oil-hydraulic cylinder 34 and an oil-hydraulic motor 62 as the actuator that works as driving means of the changeable pitch device 30, nacelle 5, and others are set on the counter 6. The above-mentioned actuator is not limited to the oil pressure cylinder 34, and is an electric cylinder, an air cylinder, a solenoid, etc. and it may only has to be a direct operated type actuator. Moreover, the oil-hydraulic motor 62 may be an electric motor.

Next, by referring FIG. 2 and FIG. 3, the internal composition of the nacelle 5 is described.

The main shaft housing 40 and a generator housing 20, etc. in addition to main shaft 10 and generator 11 are housed in the nacelle 5. Moreover, a hub 29, which houses the changeable pitch device 30 and works as hub for the braids 3, is fixedly provided on the front portion (the left side in FIG. 2) of the main shaft 10, and a generator rotor 12, having permanent magnets 14 etc. in surroundings of it, is fixedly provided on the rear portion. The braids 3 are connected with the changeable pitch device 30 that control a pitch angle of the braid 3 as explained latter.

Nacelle 5 is composed by a front nacelle 5b rotating with the braids 3, and a back nacelle 5c that is fixedly provided on the turn base 52 through stay 51 etc. and doesn't rotate with the braids 3.

As for generator rotor 12 fixed on the rear portion of the main shaft 10, as shown in FIG. 2, it is covered from the rear side with a generator housing 20, and a main shaft housing 40 is provided to cover the main shaft 10 on the front portion of the generator housing 20.

The main shaft 10 is formed to a substantially cylinder type, and a flange portion is formed at the front of it, and it is fixedly provided to the rear face of the hub 29 with bolts etc.

And, ribs 24, 24 for reinforcement is attached on the main shaft housing 40, and many fins 25.25 for heat radiation are protruded on outer of the generator housing 20.

Flange 40b having wide widths is made on the back of the main shaft housing 40, and the diameter of outer in the flange 40b is formed to be substantially same dimension as the diameter of the generator housing 20 provided in the rear of the main shaft housing 40. Then, forming flanges 40c for fitting bolts etc. into them by insertion around the flange 40b on the back of the main shaft housing 40, forming flange 20b for fixing on the front of the generator housing 20, and by fixing both flanges 40c, 20b mutually with bolt etc, and then the main shaft housing 40 and the generator housing 20 are fixedly provided and unified.

The main shaft housing 40 is fixedly provided placed between the stays 50, 50 fixed on the counter 6 with bolts. As to a support composition of the main shaft housing 40, it is acceptable to place it between the stays 50, 50, or place and fix on the stays 50, 50. Or, it is also available that the stays 50, 50 are formed as combined with the main housing 40.

Flange 20c is formed on the back of the generator housing 20, and by fixing the flange 20 and a flange 21b formed around an attachment board 21 with bolts etc., the attachment board 21 closes a inner back of the space of generator housing 20. The attachment board 21 is formed substantially disk shape, a cylinder penetration hole 21c, which allows bellow mentioned an oil-hydraulic cylinder 34 penetrate through it, is formed in the center of the disk shape.

Thus, since the main shaft housing 40 and the generator housing 20 are combined, Relatively rotating between the main shaft housing 40 and the generator housing 20 is impossible, support legs etc. for attaching of the generator housing 20 are unnecessary, the number of parts can be decreased, and the simplification and the reduction in costs of the installation work can be achieved.

Generator 11 is composed by a generator rotor 12 fixed to the back of the main shaft 10, and a stator 13 arranged opposing to the generator rotor 12 with intervals between them. In the front and inner of the generator rotor 12, a flange 12b having wide widths is provided. And, a flange 12c penetrating bolts 55 through of it are formed further inner portion of the flange 12b, on the other hand, a flange 10b are formed on the back of main shaft 10. Then, by fixing both flanges 10b and 12c with bolts 55 etc., the main shaft 10 and the generator rotor 12 are combined. Thus, the shape of the generator rotor 12 is short cylinder shape opening the rear side.

Therefore, if the attachment board 21 is removed, with touching the generator rotor 12 to the main shaft 10 from back side of the main shaft 10, and keeping this touching condition, operator can insert his/her hands from back side into the generator rotor 12, and can fixedly provide the generator rotor 12 on the main shaft 10 with inserting and tightening bolts between flanges 10b, 12c.

Thus, since the generator rotor 12 having a backward opening in the generator housing 20, and the main shaft 10 and the generator rotor 12 are detachably fixed through the opening, if the attachment board 21 is removed, with touching the generator rotor 12 to the main shaft 10 from back side of the main shaft 10, and keeping this touching condition, operator can insert his/her hands from back side into the generator rotor 12, and can fixedly provide the generator rotor 12 on the main shaft 10 with inserting and tightening bolts between flanges 10b, 12c. Additionally, lightening and compacting of the wind turbine apparatus 1 can be achieved.

Permanent magnets 14 are fixedly provided on around the generator rotor 12, stators 13 fixedly provided on around the inner of the generator housing 20 are composed of coils, and the generator 11 is a composition of an alternator of a permanent magnet type. Besides this, an induction generator, such as a squirrel-cage type or a winding type, is also acceptable.

Thus, by having large diameter of the generator rotor 12, a speed-increasing device for increasing the speed of rotation with a complex mechanism of a gear mechanics etc. is not needed for generating electricity, and electricity can be generated by transmitting the rotation of wind wheel 2 as it is. Furthermore, the generator rotor 12 may be composed of coils instead of the composition in which the permanent magnets 14 are set on the generator rotor 12.

The main shaft housing 40 is provided in outer of the main shaft 10 at prescribed intervals, and then the main shaft 10 is covered with the main shaft housing 40. And, as previously stated, the generator rotor 12 is not-relatively rotatable to the main shaft 10, and rotate with the main shaft by rotates of the wind wheel 2.

On the other hand, the stators 13 doesn't rotate even if wind wheel 2, the main shaft 10, and the generator rotor 12 rotate since it is fixed to the inner surface of the generator housing 20 fixed to the main shaft housing 40 supported by stay 50 fixed to the counter 6.

Thus, the generator housing 20 is provided as to cover the generator rotor 12 fixed to the main shaft 10, and the main shaft housing 40 is provided as to cover the main shaft 10, and then the main shaft 10 and the generator rotor 12 are composed as relatively rotatable to the main shaft housing 40 and the generator housing 20.

As previously stated, the generator housing 20, the stator 13, and the attachment board 21 are symmetrical for rotation axis of the generator rotor 12 (center of axis) as a whole. However, the stator 13 fixed in generator housing 20 only has to be symmetrical for the center of axis of the main shaft 10, and the shape of the generator housing 20 need not be especially symmetrical.

And, an oil-hydraulic cylinder 34 to control the changeable pitch device 30 penetrates to the center part of the attachment board 21, and the oil-hydraulic cylinder 34 is fixedly provided on the attachment board 21 with bolts etc. As the oil-hydraulic cylinder 34 is fixedly provided on the attachment board 21, it does not rotate even if the main shaft 10 or the generator rotor 12 rotates.

Provided with the above-mentioned composition, the main shaft 10 and the generator rotor 12 are provided in the states of penetrating through the main shaft housing 40 and generator housing 20, and supported on front and back sides (direction of the center of axis) through a front bearing 15 and a back bearing 16. Thus, since the main shaft 10 is supported through the bearings 15.16, the main shaft 10 and the generator rotor 12 are relatively rotatable to the main shaft housing 40 and the generator housing 20.

With this composition, the main shaft 10 rotates when the wind wheel 2 receives winds. As a result, the generator rotor 12 fixed to the main shaft 10 rotates to the stator 13 fixed to the generator housing 20, and power generation is performed between the generator rotor 12 and the stator 13. Namely, the rotation power converted from the wind power energy by wind wheel 2 is transmitted to the main shaft 10, and this rotation power is converted into the electrical energy by the generator 11.

Next, by referring FIG. 3, the internal composition of the main shaft 10 is described.

In this embodiment, power generation is performed transmitting the rotation of the wind wheel 2 to the main shaft 10 without increasing of speed using a speed-increasing device etc. with a gear mechanics. Therefore, since the generator 11 becomes a low-speed type, and becomes a large diameter one, the diameter of the main shaft 10 and the generator rotor 12 is bigger than that of the case to comprise a speed-increasing device. Thus, even if the thickness of the main shaft 10 and generator rotor 12 is thinned, by making the diameter of the main shaft 10 and the generator rotor 12 a large diameter, the strength of them can be guaranteed. Lightening the main shaft 10 can be attempted by shortening and thinning the main shaft 10. And, mentioned as follows, forming an inner space of the generator housing 20 in rear side of the main shaft 10 by shortening the main shaft 10, the inner space can be used effectively.

As explained above, the shape of the hub 29 and the main shaft 10 is stepped cylindrical shape having an inner space. Effective use of the inner and rear space of the main shaft 10 is attempted by housing the oil-hydraulic cylinder 34, arms 31, a link 32, a rod bearing 33, and a pitch control axis 37, etc., which compose the changeable pitch device 30, in the space. Further more, the front end of the main shaft 10 is composed by a detachable disk 53 fixed with the bolt etc. to be able to make an opening for processing, assembly, and maintenance.

Plural braids 3, 3, 3 are attached to the hub 29 fixedly provided on the front end of the main shaft 10. Therefore, plural openings 29b, 29b, the number of them is same as of the braids 3, to install braids 3 are formed at the hub 29. Each shank 4 that connects the main shaft 10 and the braid 3 is inserted in each opening 29b, and each shank 4 rotatably supported by the main shaft 10 through a bearing 41. And, the braid 3 is connected with the one side of the shank 4, which projects from the main shaft 10 to the outside.

Thus, the braid 3 can be turned to the main shaft 10 since shank 4 rotatably connected with the main shaft 10. As a result, a pitch angle of the braid 3 can be changed by turning the shank 4.

Such changes of the pitch angle of the braid 3 are performed with the changeable pitch device 30. The changeable pitch device 30 is equipped for changing the pitch angle of the braid 3 in order to adjust the rotational speed of the wind wheel 2 to a suitable rotational speed for the generator 11 according to the speed of the wind. And this changeable pitch device 30 comprises arms 31, a link 32, a rod bearing 33, an oil-hydraulic cylinder 34, and a pitch control axis 37, etc. Moreover, the changeable pitch device 30 is operated with hydraulic power unit.

The change of the pitch angle of the braid 3 performed with the changeable pitch device 30 is described.

One part of the arm 31 is connected and fixed to one part of the shank 4 (the side of the hub 24) where the connecting position is eccentric to the axis of rotation of the shank 4, and the other side of the arm 31 is pivotally supported by a part of the link 32. Moreover, the other part of the link 32 is pivotally supported by a point 37b of the pitch control axis 37. Further, it is possible that the length of the link 32 is can be adjusted with installing turnbuckles etc.

The pitch control axis 37 is provided so as to expand to the same direction as rod 34a through rod bearing 33 on the extended line of the rod 34a of oil-hydraulic cylinder 34. The rod bearing 33 composed of a thrust bearing etc., and installed in a point of the rod 34a. Thus, pitch control axis 37 is provided as relatively rotatable to the rod 34a, and movable in the direction of a center of axis of the pitch control shaft 37.

The oil-hydraulic cylinder 34 is provided along the center of axis of the main shaft 10. Namely, the stator 13, the generator rotor 12, the main shaft 10, the oil-hydraulic cylinder 34, and the pitch control shaft 37 are arranged on the same axis.

The rear portion of the oil-hydraulic cylinder 34 is fixed to the attachment board 21, and this oil-hydraulic cylinder 34 is attached to the generator housing 20. Therefore, neither the oil-hydraulic cylinder 34 nor the rod 34a rotate even if the wind wheel 2 rotates. On the other hand, the pitch control shaft 37, the link 32, and the arm 31 rotate with the rotation of the wind wheel 2.

Therefore, when the oil hydraulic cylinder 34 expands and contracts, the rod bearing 33 moves along the axial direction of oil-hydraulic cylinder 34 (direction of the center of axis of the main shaft 10). As a result, the pitch control shaft 37 moves, and the arm 31 turns with the link 32 pivotally supported by the point 37b of the pitch control shaft 37. Then, the braid 3 turns with the shank 4 making the center of axis of the shank 4 a rotational center. Further, in the main shaft 10, the pitch control shaft 37 is supported by control shaft guides 36, 38, and the control shaft guides 36, 38 are installed so that these may guide the movement of the pitch control shaft 37.

In the nacelle 5, the main shaft 10, the generator rotor 12, the arm 31, and the link 32, and the pitch control shaft 37 rotate with the rotation of the wind wheel 2. On the other hand, the main shaft housing 40, the generator housing 20, the stator 13, the attachment board 21 and oil-hydraulic cylinder 34 does not rotate even if the wind wheel 2 rotates.

Thus, since the rod bearing 33 of the pitch control shaft 37 is at least arranged in the part of the rear side opening of the generator housing 20, the shortening of the total length of the nacelle is possible. Moreover, as the generator housing 20 is opened to backward, also the installation and the arrangement of related mechanisms etc. are not restricted, and then the simplification of the installation work can be achieved.

INDUSTRIAL APPLICABILITY

This invention achieves lightening and compacting of the wind turbine apparatus supporting heavy loads apparatuses, such as the wind wheel and the generator etc., at prescribed height.

What is claimed is:

1. A wind turbine apparatus comprising a turn base on a top of a tower, a counter on the turn base, a stay on the counter, a main shaft housing and a generator housing on the stay, a bearing provided between the main shaft housing and a main shaft, a hub supported on the one side of the main shaft, and a generator rotor supported on the other side of the main shaft.

2. The wind turbine apparatus as claimed in claim 1, wherein the main shaft housing and the generator housing are combined.

3. The wind turbine apparatus as claimed in claim 1, wherein the generator rotor has a backward opening, and the main shaft and the generator rotor are detachably fixed through the opening.

4. The wind turbine apparatus as claimed in claim 3, wherein a rotational fitting for a pitch control shaft is at least disposed at the rear space of the generator housing.

* * * * *

UNITED STATES PATENT AND TRADEMARK OFFICE
CERTIFICATE OF CORRECTION

| | | |
|---|---|---|
| PATENT NO. | : 7,547,985 B2 | Page 1 of 1 |
| APPLICATION NO. | : 11/659220 | |
| DATED | : June 16, 2009 | |
| INVENTOR(S) | : Kazuhiko Takaichi | |

It is certified that error appears in the above-identified patent and that said Letters Patent is hereby corrected as shown below:

On the Title Page:
Item (73) Assignee states "Kanzaki Kokyukoki Mfg. Co., Ltd. (JP)" but should read
--Yanmar Co., Ltd. (JP)--.

Signed and Sealed this

Sixteenth Day of February, 2010

David J. Kappos
*Director of the United States Patent and Trademark Office*